Patented Nov. 14, 1922.

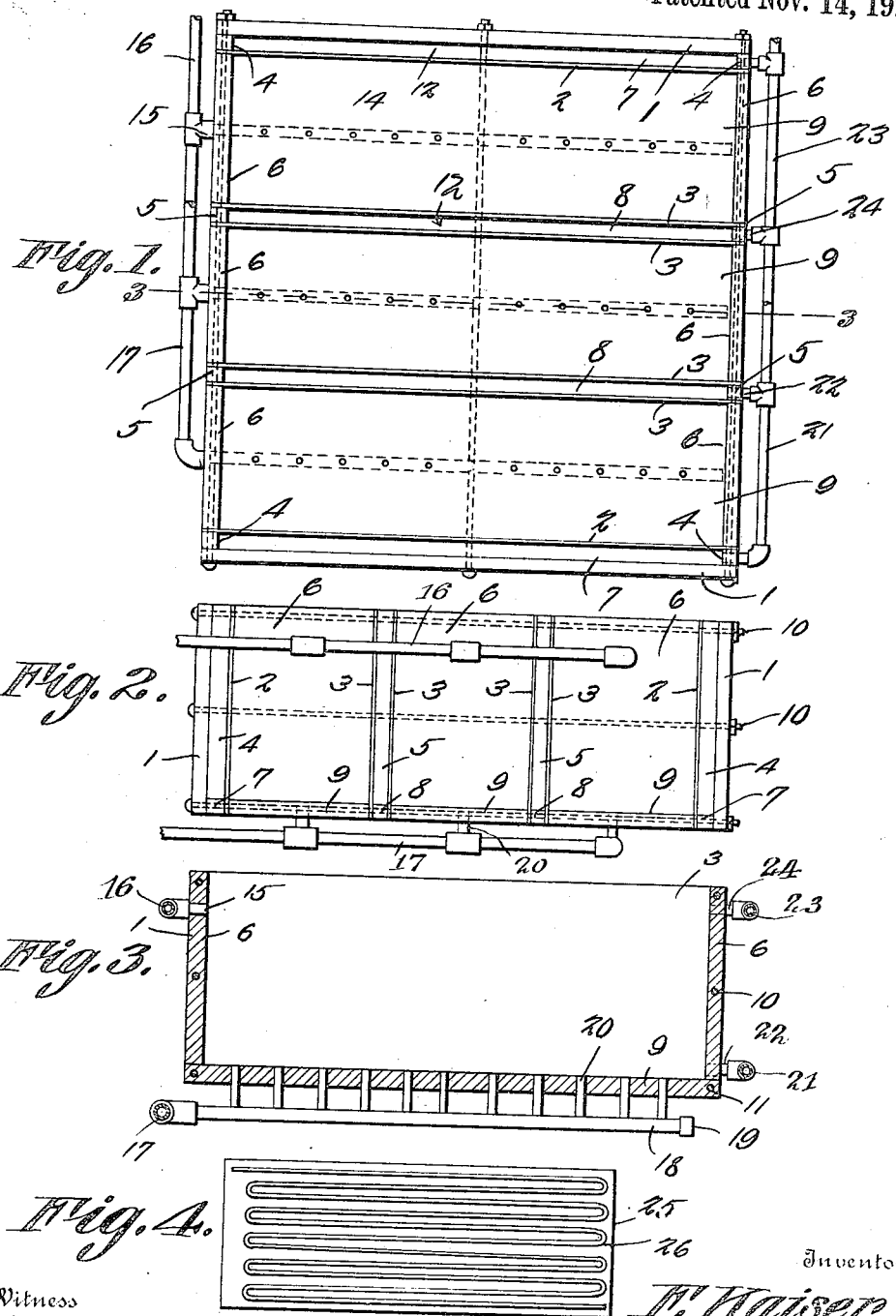

1,435,643

UNITED STATES PATENT OFFICE.

FRED KAISER, OF LANSDALE, PENNSYLVANIA.

FREEZING TANK.

Application filed September 10, 1918. Serial No. 253,459.

*To all whom it may concern:*

Be it known that I, FRED KAISER, a citizen of Switzerland, residing at Lansdale, in the county of Montgomery and State of Pennsylvania, have invented a new and useful Freezing Tank, of which the following is a specification.

The device forming the subject matter of this application is adapted to be employed for the formation of cakes of ice, and one object of the invention is to provide a means whereby clear ice may be formed out of raw water as distinguished from distilled water, the structure being of peculiar utility in small plants where it is not profitable to provide a distilling apparatus.

Another object of the invention is to provide novel means for connecting the constituent parts of the ice can or receptacle, so as to form a water-tight container.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Figure 2 is an end elevation; Figure 3 is a cross section taken approximately on the line 3—3 of Figure 1; and Figure 4 is a fragmental elevation showing a modification.

The device forming the subject matter of this application is a can or receptacle, comprising sides 1 which are made of wood. Partitions 2 are disposed parallel to the sides 1, the partitions being made of metal. Partitions 3 are disposed in pairs, in parallel relation to the partitions 2 and are located between the partitions 2. Upright spacers 4, of wood are located between the sides 1 and the partitions 2, the partitions 3 being separated by wooden spacers 5. End walls 6, made of wood, are located between the partitions 2 and 3, and between the partitions 3 of adjoining pairs. Bottom spacers 7 lie between the sides 1 and the partitions 2, bottom spacers 8 being located between the partitions 3. Bottoms 9 are located between the partitions 2 and the partitions 3, and between the partitions 3 of adjoining pairs. Bolts 10 pass through the sides 1, the spacers 4, the partitions 2, the spacers 5 and the end walls 6, and hold these parts together. The lower ends of the spacers 4 abut against the bottom spacers 7, and the lower ends of the spacers 5 abut against the bottom spacers 8, the lower ends of the walls 6 resting on the bottoms 9. Bolts 11 pass through the sides 1, the spacers 7, the partitions 2, the bottoms 9, the partitions 3 and the spacers 8, and hold these parts together. Between the partitions 2 and the sides 1, and between the pairs of partitions 3, exist spaces 12 which are adapted to receive refrigerated brine. As will be obvious from Figure 1, the structure comprises a plurality of compartments 14, adapted to receive the water to be frozen. An outlet 15 passes through the end wall 6 of each compartment 14 and may be connected to a pipe 16. The numeral 17 denotes a pipe having branches 18 extended beneath the various compartments, the pipe being closed at one end 19 and being supplied with nozzles 20 which extend upwardly through the bottoms 9 and communicate with the compartments 14. The nozzles 20 are adapted to deliver air into the compartments 14 to secure an agitation of the water in the compartments, but it is to be understood that any suitable means may be provided for agitating the water in the compartments. The numeral 21 denotes a brine inlet pipe having nipples 22, opening into the spaces 12. The numeral 23 designates a brine outlet pipe having nipples 24 opening into the spaces 12 adjacent the top of the structure.

In practical operation, raw water is placed in the compartments 14, and brine is supplied to the spaces 12. The metal plates or partitions 2 and 3 will cause the ice blocks to freeze at its sides. The ice block will not freeze at its ends, readily, because the ends 6 are made of wood, wood having a lower degree of heat conductivity than metal. Because the water does not freeze readily adjacent the ends of the block, the outlets 15 will be kept open, and when the water in the compartments 14 is agitated, and as the ice expands in freezing, the water adjacent the longitudinal center of each block will pass out through the corresponding outlet 15, carrying with it the sediment. Owing to this construction, a relatively clear block of ice can be made out of raw water, containing sediment.

Any suitable cooling means may be employed. Thus, in Figure 4, the cooling means may consist of an ammonia coil 26 disposed between the partitions 25.

Having thus described the invention, what is claimed is:—

In a freezing tank, a bottom, outer and inner partitions cooperating to form brine chambers, and end walls disposed between the inner partitions, the can embodying a water compartment bounded by the bottom, the inner partitions and the end walls, one end wall being made of a material having a lower degree of heat conductivity than the material out of which the partitions are made, said end wall having a water outlet disposed close to the upper edge thereof, and means for producing a direct upward movement of the water in the compartment from the bottom of the compartment, the difference in heat conductivity of said end wall and the partition serving to prevent freezing immediately about the intake end of the outlet, when the water freezes inwardly from the partitions, the outlet thus being kept open, for the exit of sediment, when the water in the compartment is agitated.

In testimony that I claim the foregoing as my own, I have hereto affixed my signature in the presence of two witnesses.

FRED KAISER.

Witnesses:
A. D. JOHNSON,
H. T. HOPPELL.